United States Patent Office 3,773,853
Patented Nov. 20, 1973

3,773,853
OLIGOMERIZATION OF MONO-OLEFINS
John F. Brennan, Des Plaines, and George R. Lester, Park Ridge, Ill., assignors to Universal Oil Products Company, Des Plaines, Ill.
No Drawing. Continuation-in-part of abandoned application Ser. No. 30,366, Apr. 20, 1970. This application Feb. 7, 1972, Ser. No. 224,231
Int. Cl. C07c 3/20
U.S. Cl. 260—683.15 R
7 Claims

ABSTRACT OF THE DISCLOSURE

Olefinic compounds, and particularly mono-olefinic hydrocarbons, are oligomerized by treatment with a catalyst comprising a tantalum-containing compound at temperatures ranging from about ambient to about 250° C. and at pressures ranging from about 1 to about 100 atmospheres.

CROSS REFERENCE TO RELATED APPLICATIONS

This application is a continuation-in-part of our co-pending application Ser. No. 30,366, filed Apr. 20, 1970, now abandoned.

BACKGROUND OF THE INVENTION

Heretofore, it has been known to subject olefinic hydrocarbons and particularly mono-olefinic hydrocarbons to polymerization or dimerization reactions. The particular catalysts which have been used to effect this reaction, particularly the dimerization reaction, have been described as being composited on a silica-alumina and a metal promoter which is selected from the oxides of lithium, potassium, nickel, copper and gallium. Other prior art references also discuss catalytic reactions among which will be found the catalyst of the present invention. However, this catalyst has been utilized in the prior art for the disproportionation of olefins in which the disproportionation reaction is effected at relatively high temperatures, that is, from about 480° C. up to about 540° C., the disproportionation reaction being accompanied by cracking, hydrogenation, and carbon formation. In contradistinction to this, as will be hereinafter shown in greater detail, the present invention relates to a process for the oligomerization of olefinic compounds in the presence of a certain catalytic composition of matter to form desired and specific compounds. It (the oligomerization) was totally unexpected, due to the unpredictability of catalysis, that a mono-olefinic hydrocarbon could be oligomerized in a 100% selectivity with no formation of high molecular weight polymers by treatment with a tantalum-containing compound and specifically tantalum pentaoxide composited on a solid support.

SPECIFICATION

This invention relates to a process for the oligomerization of mono-olefinic hydrocarbons utilizing a catalyst consisting essentially of a tantalum-containing compound.

It has now been discovered that olefinic compounds may be oligomerized at relatively mild conditions of temperature and pressure in the presence of certain catalytic compositions of matter without the formation of high molecular weight compounds and/or carbonization of the catalyst composite. The latter usually results in a decreased efficiency of the catalytic action with an attendant need for replacement or regeneration of the catalyst when the catalytic activity drops to a point at which the efficiency of the catalysts is no longer sufficient to maintain the oligomerization reaction. In many instances it is preferred, when treating olefinic compounds and particularly olefinic hydrocarbons, to insure the formation of a desired compound. In this respect the terms "oligomerization" or "oligomers" as used in the present specification and appended claims may be defined as the formation of dimers, trimers, or tetramers of the starting material, the oligomer containing no more than four units of said starting material, and thus, the formation of relatively low molecular weight compounds, as opposed to polymerization whereby relatively high molecular weight compounds containing a great number of units are formed from the starting materials. As an example of this, ethylene may be oligomerized to form butene or hexene, the final product containing an ethylenic linkage, propylene may be oligomerized to hexene or nonylene and butene may be oligomerized to form octene or dodecene. Therefore, flue gases which contain ethylene, propylene, etc. may be subjected to oligomerization in a manner hereinafter set forth to prepare compounds which, as is well known, are useful in the chemical field. As an example of this, the butenes which may be formed are useful as intermediates in polymer and alkylate gasoline, as intermediates for formation of aldehydes and alcohols, as solvents, cross-linking agents, in the synthesis of butadiene (an important intermediate for the preparation of synthetic rubber); the hexenes may be used in the synthesis of flavors, perfumes, medicines, dyes or resins; the octenes may be used in organic syntheses or when hydrogenated in gasoline; the nonenes are used in organic syntheses as wetting agents, lube oil additives or as a chemical intermediate for surfactants; while the dodecenes may be used in flavors, perfumes, medicines, oils, dyes, resins, detergents, plasticizers, etc.

It is therefore an object of this invention to provide a process for the oligomerization of olefinic hydrocarbons utilizing certain catalytic compositions of matter.

In one aspect an embodiment of this invention resides in a process for the oligomerization of an aliphatic mono-olefin containing from 2 to about 10 carbon atoms to produce an olefinic oligomer consisting of from 2 to 4 units of said olefin which comprises treating said olefin, at a temperature of from about ambient to about 250° C. and a pressure of from about 1 to about 100 atmospheres, with a catalyst consisting essentially of a tantalum-containing compound.

A specific embodiment of this invention is found in a process for the oligomerization of an aliphatic mono-olefin which comprises treating a butene with a catalyst comprising tantalum pentaoxide composited on alumina at a temperature in the range of from about ambient to about 250° C. and a pressure in the range of from 1 to about 100 atmospheres, and recovering the resultant octenes and dodecenes.

Other objects and embodiments will be found in the following further detailed description of the present invention.

As hereinbefore set forth the present invention is concerned with a process for the oligomerization of olefinic compounds, and particularly mono-olefinic hydrocarbons, said oligomerization being effected in the presence of certain catalytic compositions of matter whereby a polymerization reaction resulting in the formation of high molecular weight polymers is prevented and, in addition, the catalyst will not be fouled by the deposits of carbon thereon, thereby decreasing the efficiency of the compositions of matter to act in a catalytic manner and thus retard the formation of the desired oligomers. Furthermore, the reaction is effected at relatively mild conditions of temperature and pressure, said oligomerization conditions including a temperature in the range of from ambient (about 20° to 25° C.) up to about 250° C. In addition it is also contemplated within the scope of this invention that the reaction may be effected at pressures ranging from 1 up to about 100 atmospheres or more. When utilizing superatmospheric pressures in the reaction, the desired operating pressure may come from the autogenous pressure of the gaseous olefin which is undergoing oligomerization or the pressure may be enhanced by the addition of a substantially inert gas such as nitrogen into the reaction zone. Examples of olefinic hydrocarbons which may undergo an oligomerization reaction according to the process of this invention will preferably comprise those mono-olefins containing from 2 up to about 10 carbon atoms in length, some specific examples of these olefins include ethylene, propylene, butene-1, butene-2, pentene-1, pentene-2, hexene-1, hexene-2, hexene-3, heptene-1, heptene-2, heptene-3, the isomeric octenes, nonenes and decenes, etc. as well as branched chain isomers of the aforementioned normal olefins such as 2-methylbutene-1, 3-methylbutene-1, 2-methylbutene-2, 2-methylpentene-1, 3-methylpentene-1, 2-methylpentene-2, 3-methylpentene-2, 2-methylhexene-1, 3-methylhexene-1, 4-methylhexene-1, etc.

As hereinbefore set forth the process is effected in the presence of certain catalytic compositions of matter, said catalyst comprising a tantalum-containing compound. In addition, it is also contemplated within the scope of this invention that the tantalum-containing compound, and specifically tantalum pentaoxide, may be composited on a solid support. Some specific examples of these solid supports will include alumina, silica and mixtures thereof such as alumina-silica, the preferred support comprising a form of alumina and particularly gamma-alumina. These catalysts may be prepared by pilling the solid support, such as alumina, with the tantalum-containing compound such as tantalum pentaoxide and thereafter calcining the composite at an elevated temperature. The procedure is performed in such a manner so that the finished catalyst will contain from about 15% to about 25% of the tantalum pentaoxide by weight of the finished catalyst composite. After pilling and calcining the catalyst, the catalyst may, if so desired, be activated prior to use in the process of this invention by heating the composite at a temperature of about 550° C. in an atmosphere of air for a period of about 2 hours followed by another hour at this temperature in a nitrogen atmosphere, and thereafter cooling the catalyst to the desired operating temperature while maintaining the nitrogen atmosphere.

The process of this invention may be effected in any suitable manner and may comprise either a batch or continuous type operation. For example, when a batch type operation is used, a quantity of the desired catalyst is activated in a manner hereinbefore set forth after being placed in an appropriate apparatus. Following this the olefin is charged to the reactor at a predetermined space velocity which, in the case of gaseous olefins may range from about 100 up to about 500, the gaseous hourly space velocity being defined as the amount of charge per amount of catalyst per hour. After passage over the catalyst at the aforementioned reaction conditions, the products are collected and subjected to various analyses such as gas-liquid chromatography.

It is also contemplated within the scope of this invention that this process may be effected in a continuous manner of operation. For example, when such a type of operation is used a quantity of the catalyst is placed in an appropriate apparatus, activated in the usual manner and thereafter the reactor is maintained at the proper operating conditions of temperature and pressure. An olefinic feed stock is continuously charged to this reactor and after a predetermined residence time has elapsed, the reactor effluent is continuously withdrawn. The desired oligomers comprising the dimers and trimers of the olefinic feed stock are separated from unreacted starting material and passed to storage while the aforesaid unreacted feed stock is recycled to form a portion of the charge.

Inasmuch as the catalyst is in a solid form, it is possible to effect the continuous manner of operation in various ways. One such method is to utilize the catalyst as a fixed bed and pass the olefinic hydrocarbon through said bed in either an upward or downward flow. Another method is to utilize the catalyst as a moving bed and pass the olefinic hydrocarbon and the catalyst bed through the reaction zone either concurrently or countercurrently to each other.

Examples of dimers and trimers of olefinic hydrocarbons which may be prepared according to the oligomerization process of this invention will include the isomeric butenes, hexenes, octenes, nonenes, decenes, dodecenes, etc., said isomers containing the ethylenic linkage in various positions on the chain as well as containing various forms of branched chain configurations.

The following examples are given to illustrate the process of the present invention which, however, are not intended to limit the generally broad scope of the present invention in strict accordance therewith.

EXAMPLE I

A tantalum-containing catalyst was prepared by pilling a gamma-alumina and tantalum pentaoxide followed by calcination of the composite so that the finished catalyst contained 20% tantalum pentaoxide. The catalyst was thereafter placed in a reactor and activated by heating in an atmosphere of air for 2 hours at a temperature of 550° C. followed by heating at this temperature in a nitrogen atmosphere for an additional period of 1 hour. Following this the catalyst was allowed to cool in the same dry nitrogen atmosphere to a temperature of 175° C. Upon reaching this temperature a feed stock of butene-1 was charged to the reactor at a gaseous hourly space velocity (the amount of charge per hour per amount of catalyst) of 180. The charge was continued for a period of 0.5 hour with a total input of 193 mmoles of butene-1. The products which were condensable at —78° C. were collected in a Dry Ice trap immediately below the reactor while the remaining products were vented through a conventional salt water and wet test material sampling system. Samples were then submitted to a gas-liquid chromatographic analysis to determine the meter balance of the product. This gas-liquid chromatographic analysis of the liquid product disclosed that 7% of the butene-1 was converted to $C_8$ and $C_{12}$ olefins; there being no evidence of higher molecular weight polymers present in the product. In addition, it was found that there was a 90% selectivity to the $C_8$ olefins and a 10% selectivity to the $C_{12}$ olefins. The structure of these olefins were determined by infrared and nuclear magnetic reasonace spectroscopy analysis which determined that the olefins were predominantly trans-di-substituted compounds having the following formula:

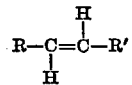

in which R and R' are alkyl groups.

When a sample test using the tantalum pentaoxide composited on alumina as a catalyst was performed at room temperature and a feed stock of butene-1 was charged to the reactor at a gaseous hourly space velocity of 225, the products which were recovered and submitted to a gas-liquid chromatographic analysis disclosed the presence of isomeric octenes and dodecenes, all of which possess a highly branched configuration. In addition there was no evidence of higher molecular weight polymers being present in the product.

EXAMPLE II

In this example a catalyst similar to that described in Example I above is prepared and activated by heating the catalyst in an oxygen-containing atmosphere such as air for a period of 2 hours at a temperature of 550° C. followed by an additional period of 1 hour at 550° C. while passing a stream of dry nitrogen over the catalyst. Thereafter the catalyst is allowed to cool to a temperature of 175° C. under a nitrogen atmosphere. Thereafter a feed stock of propylene is charged to the reactor containing the catalyst at a gaseous hourly space velocity of 330 for a period of 2 hours, the reaction temperature being maintained at 175° C. during the reaction period. The products are thereafter recovered in a manner similar to that set forth in Example I above and subjected to a gas-liquid chromatographic analysis, said analysis disclosing the presence of isomeric hexenes and nonenes without any evidence of any higher molecular weight polymers being present.

EXAMPLE III

In this example an oligomerization catalyst comprising tantalum pentaoxide which has been milled with gamma-alumina, calcined and activated by heating at a temperature of 550° C. for a period of 2 hours in an atmosphere of air and thereafter being heated for an additional period of 1 hour at 550° C. while passing dry nitrogen over said catalyst, said catalyst is allowed to cool to a temperature of 175° C. while maintaining an atmosphere of nitrogen. When the reactor has reached the 175° C. temperature, a feed stock of ethylene is charged to the reactor at a gaseous hourly space velocity of about 300, the charge being maintained for a period of 2 hours. The products are recovered utilizing a system similar to that set forth in Example I above. A gas-liquid chromatographic analysis of the products which are obtained by this oligomerization reaction will disclose the presence of isomeric butenes and hexenes having a structural formula similar to that set forth in Example I above and show no evidence of higher molecular weight polymers present in the reaction product.

We claim as our invention:

1. A process for the oligomerization of an aliphatic mono-olefin containing from 2 to about 10 carbon atoms to produce an olefinic oligomer consisting of from 2 to 4 units of said olefin which comprises contacting said olefin with tantalium pentaoxide at a temperature of from about ambient to about 250° C. and a pressure of from about 1 to about 100 atmospheres.

2. The process as set forth in claim 1 in which said tantalum-pentaoxide is composited on a solid support.

3. The process as set forth in claim 1 in which said solid support is an alumina.

4. The process as set forth in claim 3 in which said alumina is gamma alumina.

5. The process as set forth in claim 1 in which said mono-olefin is ethylene and said olefinic oligomer is a mixture of butene and hexene.

6. The process as set forth in claim 1 in which said mono-olefin is propylene and said olefinic oligomer is a mixture of hexene and nonene.

7. The process as set forth in claim 1 in which said mono-olefin is butene and said olefinic oligomer is a mixture of octene and dodecene.

References Cited

UNITED STATES PATENTS

| | | | |
|---|---|---|---|
| 3,332,989 | 7/1967 | Snyder et al. | 260—683.15 X |
| 3,442,964 | 5/1969 | Oldham | 260—683.15 X |
| 2,773,053 | 12/1956 | Field et al. | 260—683.15 X |
| 3,370,101 | 2/1968 | Hayes et al. | 260—683.2 X |
| 3,442,969 | 5/1969 | Banks | 260—683 D |
| 3,649,709 | 3/1972 | Medema et al. | 260—680 |

PAUL M. COUGHLAN, Jr., Primary Examiner